United States Patent
Bae et al.

(10) Patent No.: US 10,896,136 B2
(45) Date of Patent: Jan. 19, 2021

(54) STORAGE SYSTEM INCLUDING SECONDARY MEMORY THAT PREDICTS AND PREFETCHES DATA

(71) Applicant: SAMSUNG ELECTRONICS CO., LTD., Suwon-si (KR)

(72) Inventors: Duck Ho Bae, Seoul (KR); You Ra Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/408,850

(22) Filed: May 10, 2019

(65) Prior Publication Data

US 2020/0081848 A1 Mar. 12, 2020

(30) Foreign Application Priority Data

Sep. 12, 2018 (KR) ........................ 10-2018-0109068

(51) Int. Cl.
*G06F 12/08* (2016.01)
*G06F 12/1081* (2016.01)
*G06F 12/0862* (2016.01)
*G06F 12/1009* (2016.01)
*G06F 3/06* (2006.01)

(52) U.S. Cl.
CPC ........ *G06F 12/1081* (2013.01); *G06F 3/0611* (2013.01); *G06F 3/0638* (2013.01); *G06F 3/0656* (2013.01); *G06F 3/0683* (2013.01); *G06F 12/0862* (2013.01); *G06F 12/1009* (2013.01)

(58) Field of Classification Search
CPC .......... G06F 12/0862; G06F 2212/602; G06F 2212/6024; G06F 2212/6026
USPC ......................................................... 711/202
See application file for complete search history.

(56) References Cited

U.S. PATENT DOCUMENTS

| | | | |
|---|---|---|---|
| 9,529,722 B1* | 12/2016 | Tang | G06F 12/0862 |
| 2003/0105939 A1* | 6/2003 | Cooksey | G06F 12/0215 |
| | | | 711/203 |
| 2008/0276066 A1* | 11/2008 | Lee | G06F 12/1027 |
| | | | 711/204 |
| 2009/0125678 A1 | 5/2009 | Tokuda et al. | |
| 2010/0250853 A1* | 9/2010 | Krieger | G06F 12/1027 |
| | | | 711/122 |
| 2012/0226888 A1* | 9/2012 | Rychlik | G06F 12/1027 |
| | | | 711/207 |
| 2014/0281458 A1* | 9/2014 | Ravimohan | G06F 12/1027 |
| | | | 711/122 |

(Continued)

FOREIGN PATENT DOCUMENTS

| | | |
|---|---|---|
| JP | 2010-191983 | 9/2010 |
| KR | 10-1522402 | 5/2015 |

*Primary Examiner* — Than Nguyen
(74) *Attorney, Agent, or Firm* — F. Chau & Associates, LLC

(57) ABSTRACT

A storage device includes a storage region in which first data is stored and that is accessed using a first virtual address, and a memory controller configured to control stored data stored in the storage region. The memory controller predicts second data to be accessed using a second virtual address based on the first virtual address, prefetches the second data into an external device, and modifies a physical address mapped to the second virtual address so that the prefetched second data is accessible by a host in communication with the storage device.

20 Claims, 21 Drawing Sheets

(56) References Cited

U.S. PATENT DOCUMENTS

| | | | |
|---|---|---|---|
| 2015/0026449 A1* | 1/2015 | Heo | G06F 9/4406 713/2 |
| 2015/0193155 A1 | 7/2015 | Sarcone et al. | |
| 2016/0171048 A1 | 6/2016 | Idei et al. | |
| 2017/0031823 A1 | 2/2017 | Ross et al. | |

* cited by examiner

STORAGE SYSTEM INCLUDING SECONDARY MEMORY THAT PREDICTS AND PREFETCHES DATA

CROSS-REFERENCE TO RELATED APPLICATIONS

This application claims priority under 35 U.S.C. § 119 to Korean Patent Application No. 10-2018-0109068 filed on Sep. 12, 2018 in the Korean Intellectual Property Office, the disclosure of which is incorporated by reference herein in its entirety.

TECHNICAL FIELD

Exemplary embodiments of the present disclosure relate to data access in a storage device and a storage system.

DISCUSSION OF THE RELATED ART

A storage system includes a main memory device that allows for fast access, but which may be small and expensive, and an auxiliary memory device that allows for relatively slow access, but which has a large capacity and is inexpensive. An example of a main memory device is a dynamic random-access memory (DRAM). Examples of an auxiliary memory device include a block storage device such as a hard disk drive (HDD) and a solid-state drive (SSD), and a byte-accessible storage device such as a phase-change memory random-access memory (PRAM) and a spin-transfer torque magnetic random-memory (STT-MRAM).

To make use of the fast access time of the main memory device, data in a frequently accessed auxiliary memory device may be read from the storage and prefetched into the main memory device. Examples of such prefetch techniques include modifying a host or an application, or adding a separate layer for access to the prefetched main memory device. However, such techniques require additional resources or a separate layer for the operation, which may result in increased complexity and manufacturing cost.

SUMMARY

Exemplary embodiments of the present disclosure provide a storage device with improved operational performance.

Exemplary embodiments of the present disclosure also provide a storage system with improved operational performance.

According to an exemplary embodiment of the present disclosure, a storage device includes a storage region in which first data is stored and that is accessed using a first virtual address, and a memory controller configured to control stored data stored in the storage region. The memory controller predicts second data to be accessed using a second virtual address based on the first virtual address, prefetches the second data into an external device, and modifies a physical address mapped to the second virtual address. The prefetched second data is accessible by a host in communication with the storage device.

According to an exemplary embodiment of the present disclosure, a storage system includes a first storage device configured to store first data. The first data is accessed by a host using a first virtual address at a first speed. The storage system further includes a second storage device configured to store second data. The second data is accessed by the host using a second virtual address at a second speed. The second virtual address is different from the first virtual address, and the second speed is different from the first speed. The second storage device predicts predicted data to be accessed by the host based on the second virtual address, and prefetches the predicted data into the first storage device.

According to an exemplary embodiment of the present disclosure, a storage system includes a first storage device configured to store first data. The first data is accessed by a host using a first virtual address. The storage system further includes a second storage device configured to store second data. The second data is accessed by the host using a second virtual address and a third virtual address. The second virtual address and the third virtual address are different from the first virtual address, and the second virtual address and the third virtual address are adjacent to each other. The second storage device predicts predicted data to be accessed by the host using a fourth virtual address adjacent to the third virtual address based on the second and third virtual addresses, and prefetches the predicted data into the first storage device.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF THE EXEMPLARY EMBODIMENTS

Figure 1:
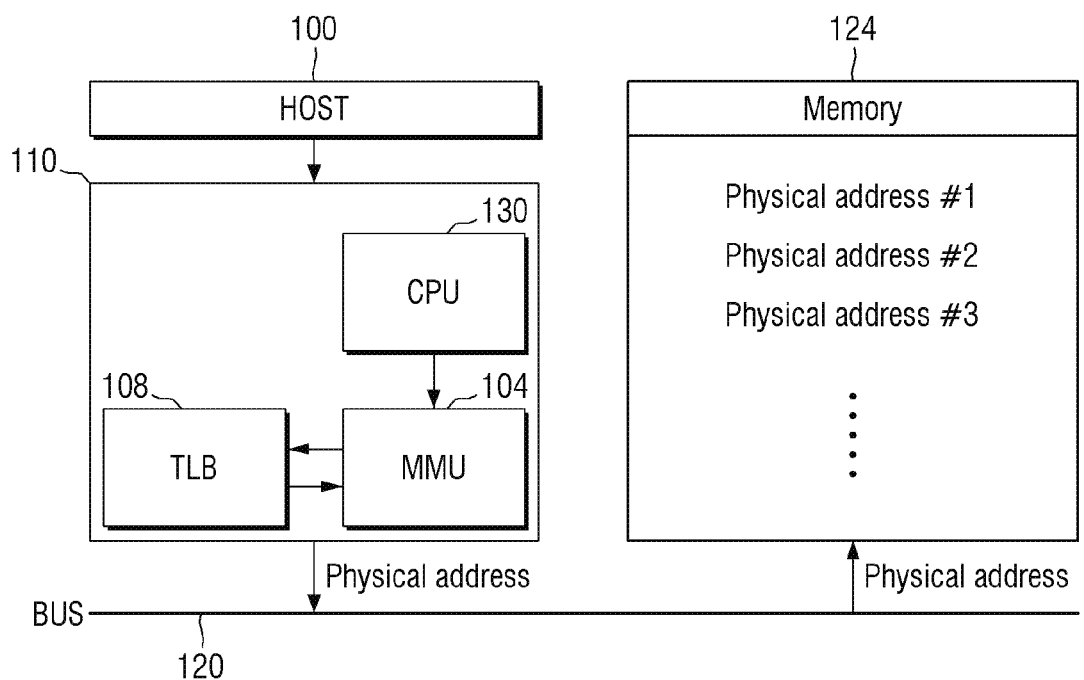
FIG. 1 is a block diagram illustrating an address translation operation when a host accesses a memory device.

Exemplary embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment.

It will be further understood that descriptions of features or aspects within each exemplary embodiment should typically be considered as available for other similar features or aspects in other exemplary embodiments, unless the context clearly indicates otherwise.

Figure 2:
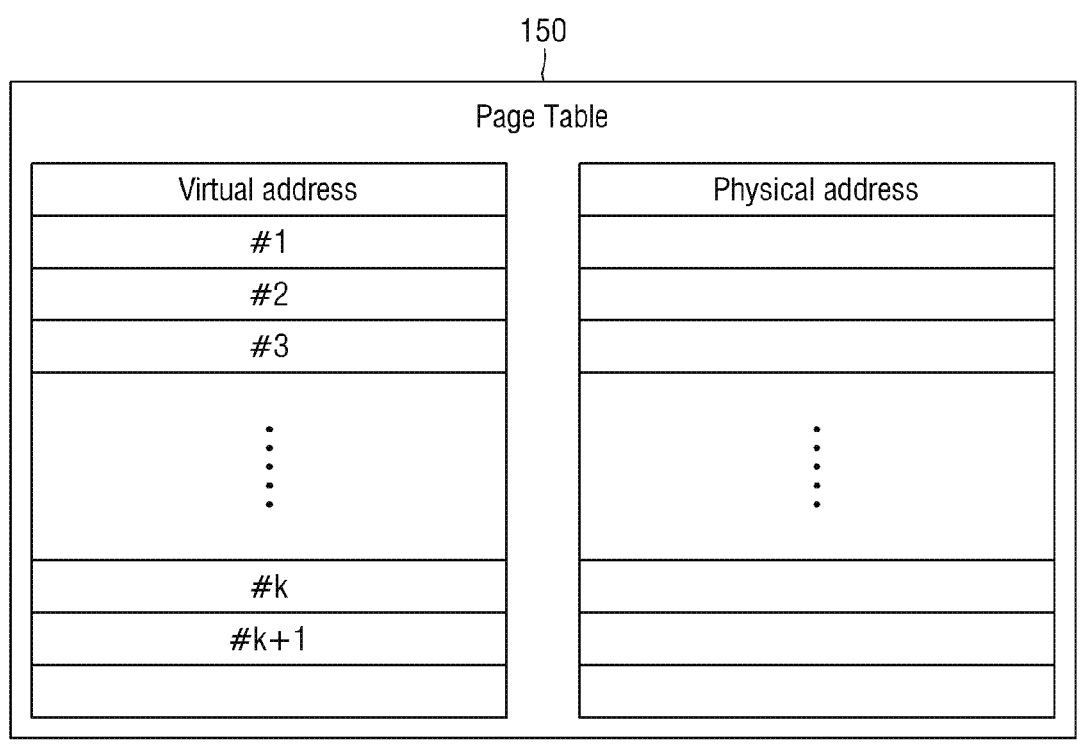
FIG. 2 is a diagram illustrating address translation using a page table.

FIG. 1 is a block diagram illustrating an address translation operation when a host accesses a memory device. FIG. 2 is a diagram illustrating address translation using a page table.

Referring to FIGS. 1 and 2, a host 100 may access a memory 124 with the aid of, for example, a memory management unit 104 and a page table 150.

The host 100 may be implemented as, but is not limited to, a host processor, an integrated circuit (IC), a motherboard, a system-on-chip (SoC), an application processor (AP), a mobile AP, a web server, a data server, or a database server.

In exemplary embodiments, when the host 100 accesses the memory 124, a central processing unit (CPU) 130 may send a virtual memory address to the memory management unit 104. The memory management unit 104 may be implemented as, for example, a hardware component including, for example, a circuit. However, it is to be understood that exemplary embodiments of the present disclosure are not limited thereto. For example, in exemplary embodiments, the memory management unit 104 may also be implemented as a software component for performing a specific function.

The memory management unit 104 translates virtual addresses into physical addresses, and may perform functions such as, for example, memory protection, cache management and bus arbitration. Further, in exemplary embodiments, the memory management unit 104 may be responsible for bank switching in an 8-bit architecture.

A kernel 110 may allocate hardware resources among processes as required. A kernel 110 is a component that performs, for example, process control, memory control, a system call required by a program for an operating system, etc., and may be operated under control of the operating system. The kernel 110 may also manage memory devices such as a main memory device and an auxiliary memory device in a virtual address space within the system. For example, when the host 100 accesses the devices, the host 100 may access the devices using the virtual addresses provided by the kernel 110 instead of the physical addresses. The kernel 110 may be included in the host 100.

The virtual addresses allow for the system to effectively create a virtual memory space that is larger than the actual physical memory space. The process in which the actual physical memory space is divided into the virtual memory spaces is referred to as paging.

The kernel 110 may utilize the memory management unit 104 to perform the translation between the virtual addresses and the physical addresses. The kernel 110 may manage the mapping unit of the virtual address spaces as pages of $2^n$ bit size, e.g., 4 KB, where n is a natural number. Some virtual pages may be associated with a single page of physical addresses. When the host 100 issues a request for access, the CPU 130 may send the virtual address to the memory management unit 104.

To access the data stored in the memory 124, a virtual address has to be translated into a physical address. To do so, the page table 150, which is a translation table stored in the system memory, may be utilized. The page table 150 has a large volume, and thus, the page table 150 may be stored in the system memory (e.g., memory management unit 104). The memory management unit 104 may translate the virtual addresses into the physical addresses.

The page table 150 may be a data structure used in the paging technique. The page table 150 may store page information of processes. Every process may have a single page table 150. The page table 150 may include indices corresponding to the page numbers, respectively. In addition, the page table 150 may store information containing a physical memory address allocated to the page. The operation of the page table 150 may be different depending on the architecture and the operating system.

Accessing the page table 150 stored in the system memory (e.g., memory management unit 104) may be a factor that contributes to slowing down the overall system performance. Accordingly, the memory management unit 104 may cache a part of the page table 150 that has been recently used in a translation lookaside buffer (TLB) 108. By caching a part of the page table 150 in the translation lookaside buffer 108, it is possible to reduce the access delay to the page table 150. The translation lookaside buffer 108 may include physical address information or index information for the data stored in the memory 124. For example, the CPU 130 may scan the translation lookaside buffer 108 to determine if there is data to be accessed in the memory 124.

The translation lookaside buffer 108 may be a special type of cache memory. Like other types of cache memories, the translation lookaside buffer 108 may be implemented as a memory device having a relatively small capacity specifically designed for fast access. For example, the translation lookaside buffer 108 may have a relatively small capacity and a relatively fast access speed. Thus, if the capacity of the translation lookaside buffer 108 is fully used, old translation information may be removed and new translation information may be added.

The translation lookaside buffer 108 may include a tag array and a data array provided in the cache memory. In the tag array, each of the tag lines stores a virtual address. The tag lines may then be associated with the data lines in the data array, respectively, where the translation of the physical addresses associated with the virtual addresses is stored.

It is assumed that the host 100 accesses the memory 124. The CPU 130 may check whether the page table 150 containing the translation information used to translate the virtual addresses into the physical addresses is in the translation lookaside buffer 108, which can be accessed quickly by the memory management unit 104. If the page table 150 containing translation information is in the translation lookaside buffer 108, the host 100 may access the memory 124 using the physical address translated through the page table 150.

If no page table 150 is found in the translation lookaside buffer 108 (if a translation lookaside buffer miss occurs), the translation lookaside buffer 108 and the memory management unit 104 share the page table 150. Accordingly, the CPU 130 may access the translated physical address by using the page table 150 in the memory management unit 104.

Thus, when the page table 150 is found in the translation lookaside buffer 108, fast access may be achieved using the translated physical address.

The CPU 130 may sometimes fail to fetch a physical memory address from the page table 150. This is referred to as a page fault or page failure. Usually, a page failure may occur because a page of the virtual address space is not in the memory 124. When this happens, the operating system may be responsible for the processing. The operating system may allocate pages in an empty memory space. If there is no empty memory space, the operating system may pull out one page of the actual memory, store it in the auxiliary memory device (in a process referred to as paging), and allocate the requested page there.

The bus 120 may be connected between the host 100 and the memory 124, and may facilitate communication between the host 100 and the memory 124. For example, data and requests may be transmitted via the bus 120. Accordingly, the host 100 may access the physical address in the memory 124 via the bus 120. Referring to the page table 150 illustrated in FIG. 2, k is a natural number.

In the following description, when the host 100 is described as performing an access operation (e.g., when the host 100 accesses or is accessing), it is to be understood that the above-described operations are performed.

Figure 3:
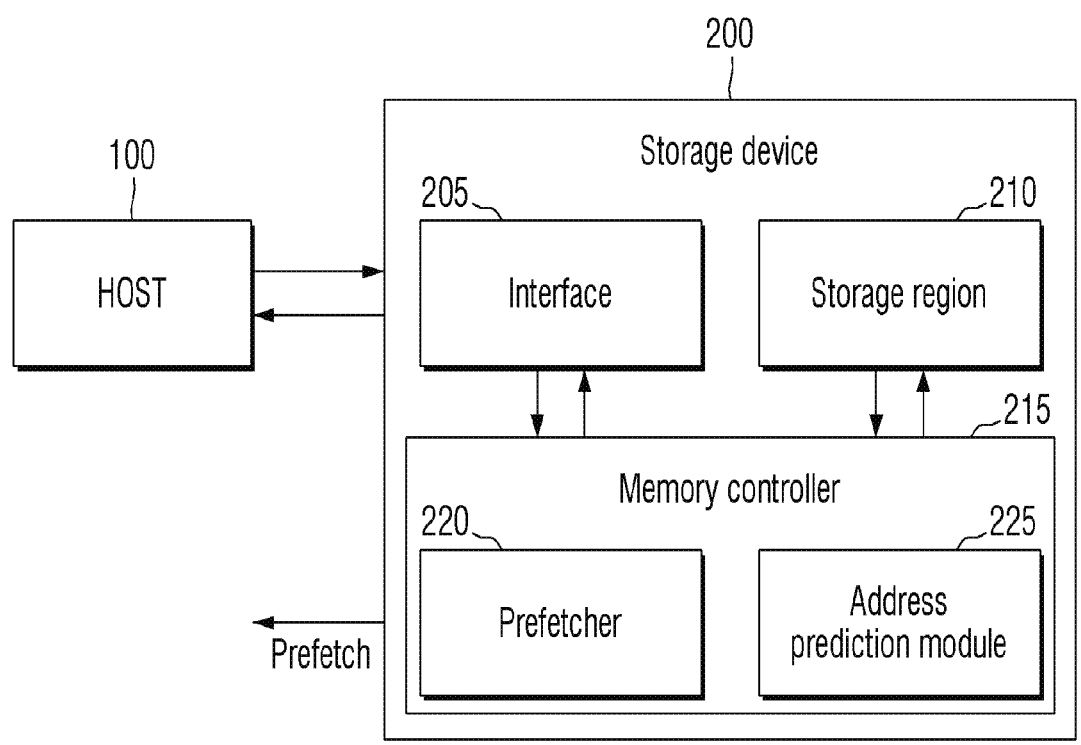
FIG. 3 is a block diagram of a storage device according to exemplary embodiments of the present disclosure.

FIG. 3 is a block diagram of a storage device according to exemplary embodiments of the present disclosure.

The storage device 200 shown in FIG. 2 may include, for example, an interface 205, a storage region 210, and a memory controller 215.

The host 100 may access the storage device 200 using the above-described virtual address.

The storage device 200 may transmit/receive commands and/or data to/from the host 100 via the interface 205.

The interface 205 may be implemented as, for example, a peripheral component interconnect (PCI) interface, a peripheral component interconnect express (PCIe) interface, a non-volatile memory express (NVMe) interface, a dual in-line memory module (DIMM) interface, etc., which provide byte-accessibility. However, it is to be understood that the interface 205 is not limited thereto. The interface 205 may transmit electrical signals or optical signals.

Data may be stored in the storage region 210 of the storage device 200. The storage region 210 may include, for example, a phase-change random-access memory (PRAM), a resistive random-access memory (RRAM), a magnetic random-access memory (MRAM), a spin-transfer torque magnetic random-access memory (STT-MRAM), a ferroelectric random-access memory (FeRAM), a NOR flash memory, or a NAND flash memory. However, it is to be understood that the storage region 210 is not limited thereto.

In exemplary embodiments, the storage region 210 may include block storage. In addition, in exemplary embodiments, the interface 205 may be a byte-accessible interface that provides byte-accessibility, such as, for example, a PCIe interface. In this case, the storage region 210 may include a byte-accessible storage device.

The data stored in the storage region 210 may be controlled by the memory controller 215. The memory controller 215 may receive a request for access from the host 100 through the interface 205 to thereby access the storage region 210. In this manner, the memory controller 215 may control transmission or processing of commands and/or data.

In exemplary embodiments, the memory controller 215 may include a prefetcher 220 and an address prediction module 225. The prefetcher 220 and the address prediction module 225 may also be referred to as a prefetcher circuit and an address prediction circuit, respectively.

The prefetcher 220 may prefetch data that is frequently used by the host 100 and/or data that is predicted to be used next by the host 100 into another storage region (e.g., another external memory). As a result, the access time of the host 100 may be reduced. Herein, an external device/memory may refer to a device/memory external to the storage device 200, and is described in further detail below.

Herein, when data is described as being prefetched "into" a storage device, storage region, storage space, etc., it is to be understood that the data is fetched from another location and stored in said storage device, storage region, storage space, etc.

The address prediction module 225 may predict the data to be accessed next by the host 100 in advance. The prefetcher 220 described above may prefetch the data predicted by the address prediction module 225 into another space.

Hereinafter, the operation of a storage device such as, for example, the storage device 200 of FIG. 3, according to exemplary embodiments of the present disclosure, will be described with reference to FIGS. 3 to 10.

Figure 4:
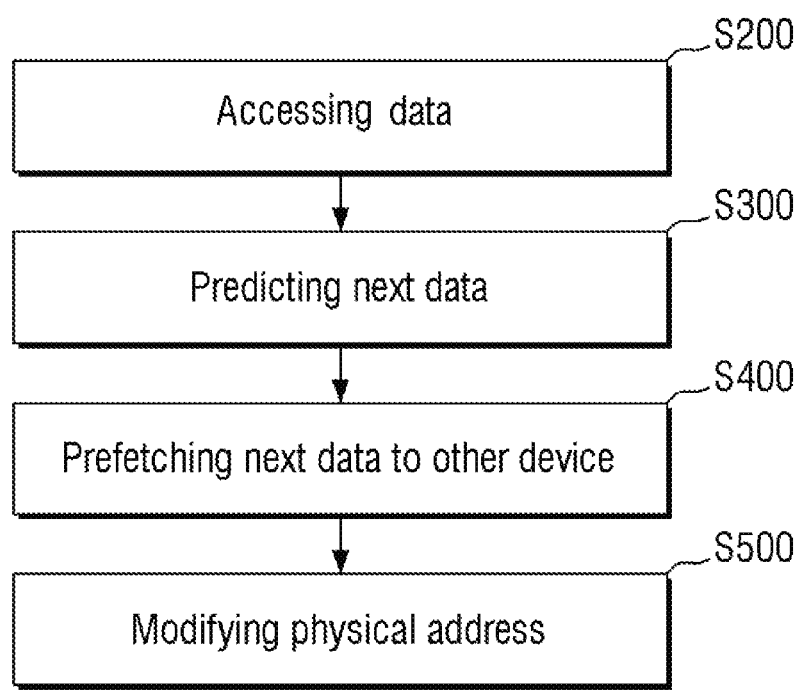
FIG. 4 is a flowchart illustrating a prefetch operation of a storage device.
Figure 5:
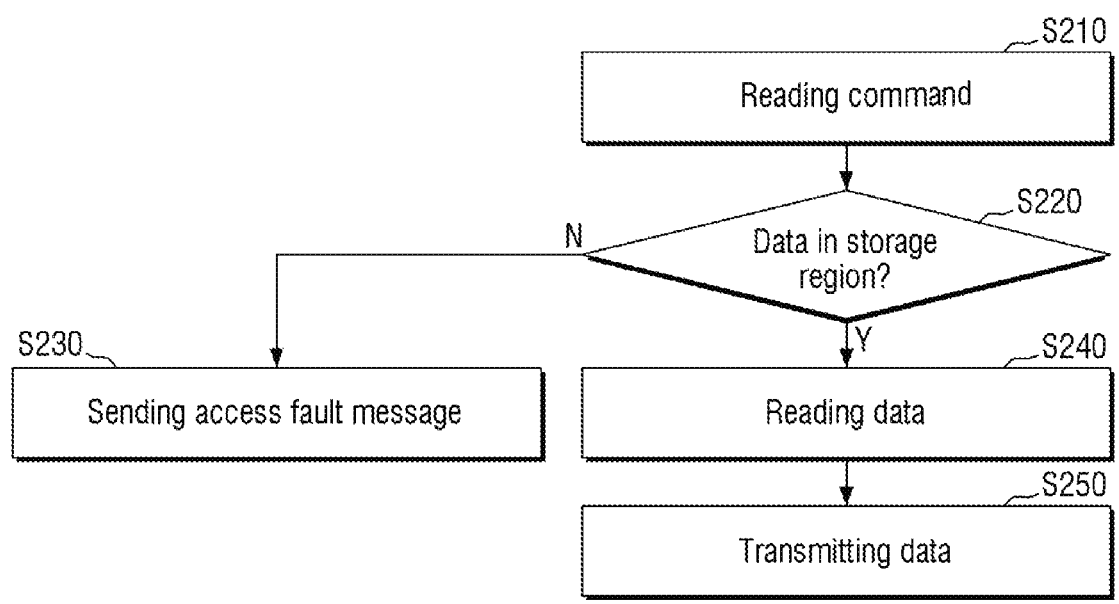
FIG. 5 is a flowchart illustrating an operation when a storage device receives a request to read data from a host.
Figure 6:
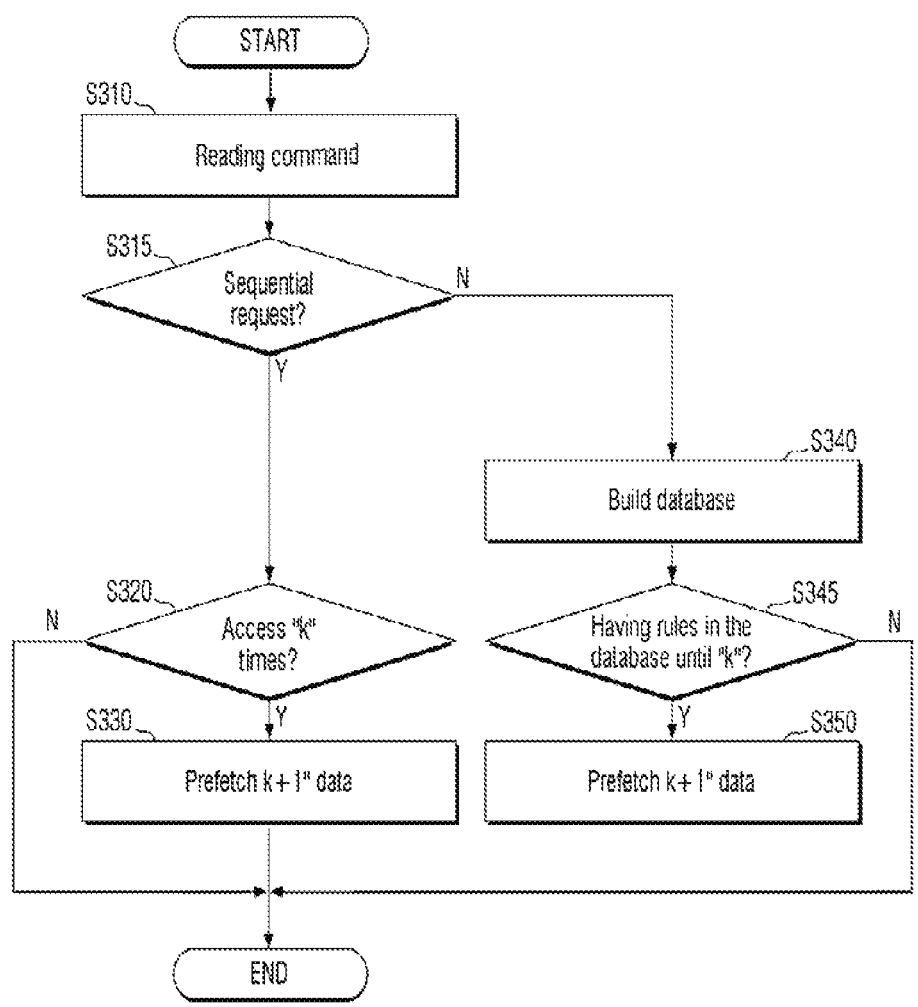
FIG. 6 is a flowchart illustrating an address prediction operation of FIG. 4.
Figure 7:
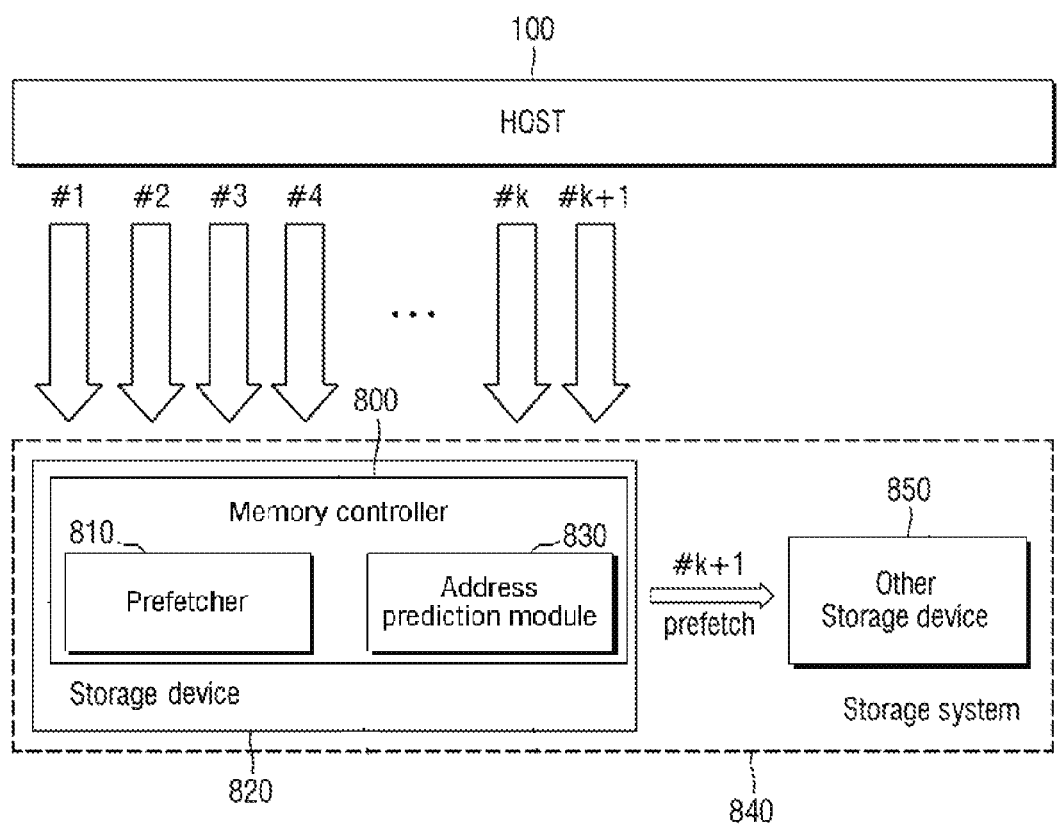
FIG. 7 is a block diagram illustrating an address prediction operation of FIG. 6.
Figure 8:
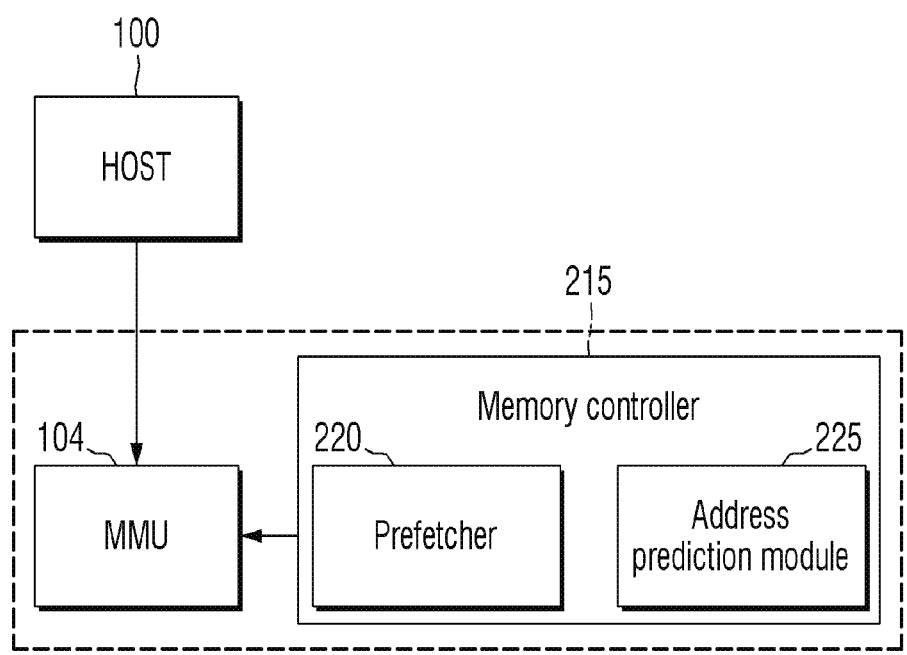
FIG. 8 is a block diagram illustrating a physical address modification operation.
Figure 9:
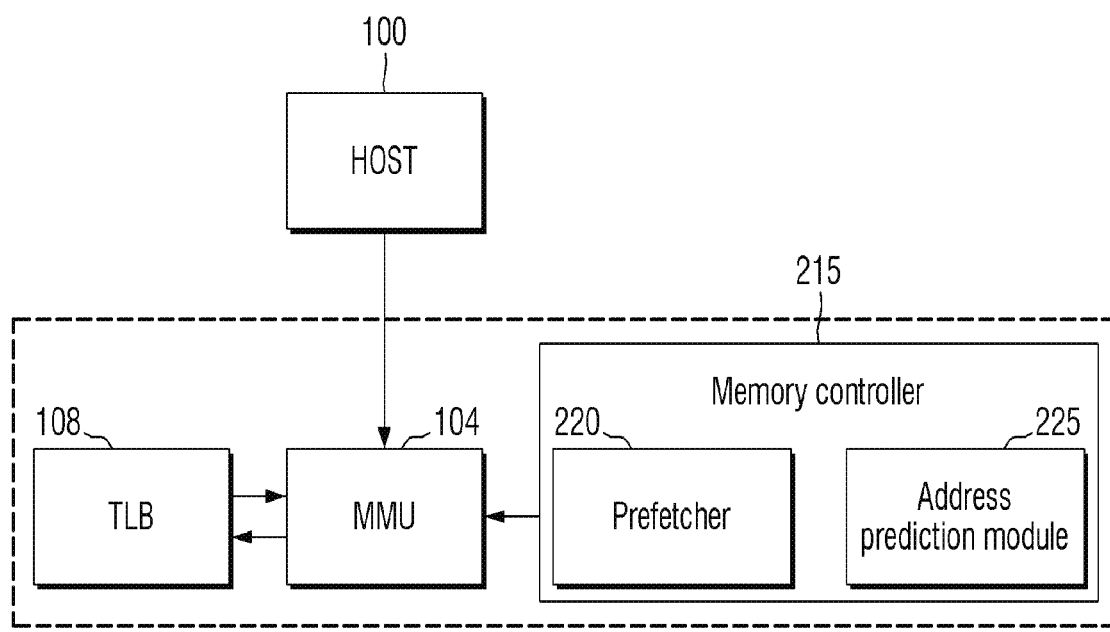
FIG. 9 is another block diagram illustrating a modification operation of a physical address by the memory controller of FIG. 3 according to exemplary embodiments of the present disclosure.
Figure 10:
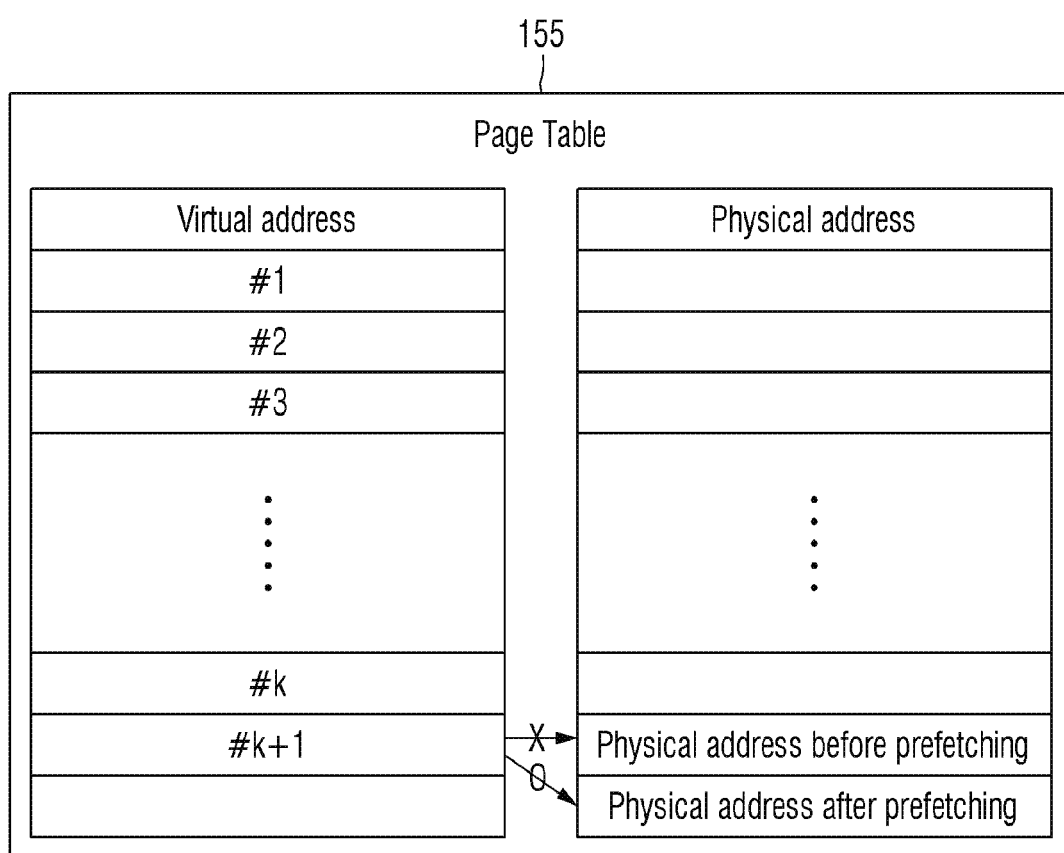
FIG. 10 is another block diagram illustrating a modification operation of a physical address by the memory controller of FIG. 3 according to exemplary embodiments of the present disclosure.

FIG. 4 is a flowchart illustrating a prefetch operation of a storage device (e.g., the storage device 200 of FIG. 3). FIG. 5 is a flowchart illustrating an operation when a storage device (e.g., the storage device 200 of FIG. 3) receives a request to read data from a host (e.g., the host 100 of FIG. 3). FIG. 6 is a flowchart illustrating an address prediction operation of FIG. 4. FIG. 7 is a block diagram illustrating an address prediction operation of FIG. 6. FIG. 8 is a block diagram illustrating a physical address modification operation. FIG. 9 is another block diagram illustrating a modification operation of a physical address by the memory controller 215 of FIG. 3 according to exemplary embodiments of the present disclosure. FIG. 10 is another block diagram illustrating a modification operation of a physical address by the memory controller 215 of FIG. 3 according to exemplary embodiments of the present disclosure.

Initially, referring to FIG. 4, a host (e.g., the host 100 of FIG. 3) accesses the storage device (e.g., the storage device 200 of FIG. 3) using a virtual address (operation S200). In exemplary embodiments, the host 100 accesses the storage device 200 to request data, and the storage device 200 may return the requested data to the host 100. Hereinafter, such an operation will be described in more detail with reference to FIGS. 3 and 5.

Initially, referring to FIG. 5, the interface 205 of the storage device 200 receives commands and/or data from the host 100 (operation S210). For example, referring to FIG. 3, when the host 100 accesses the storage device 200, the interface 205 of the storage device 200 may read a command from the host 100 and transmit the command to the memory controller 215 of the storage device 200.

Referring back to FIG. 5, the memory controller 215 may scan the storage region 210 to determine whether there is a command and/or data received from the host 100 present in the storage region 210 (operation S220).

For example, referring to FIG. 3, once the memory controller 215 receives a command from the host 100 via the interface 205, the memory controller 215 may check to determine whether data associated with the command received from the host 100 is present in the storage region 210.

Referring back to FIG. 5, if no data to be accessed by the host 100 is found in the storage region 210 in operation S220, the memory controller 215 transmits an access failure message to the host 100 via the interface 205 (operation S230).

For example, referring to FIG. 3, if the memory controller 215 fails to find data to be accessed by the host 100 by scanning the storage region 210, the memory controller 215 may transmit an access failure message to the host 100 via the interface 205.

Referring back to FIG. 5, if data to be accessed by the host 100 is found in the storage region 210 in operation S220, the memory controller 215 reads data from the storage region 210 (operation S240), and transmits the data read in operation S240 to the host 100 via the interface 205 (operation S250).

For example, referring to FIG. 3, if the memory controller 215 finds data to be accessed by the host 100 in the storage region 210, the memory controller 215 may transmit the data to the host 100 via the interface 205.

Referring back to FIG. 4, the address prediction module 225 of the memory controller 215 predicts data to be accessed next by the host 100 based on the data accessed by the host 100 using the virtual address in operation S200 (operation S300).

Operation S300 will be described in more detail with reference to FIG. 6.

Referring to FIG. 6, the host 100 accesses the data in the storage device 200 and the address prediction module 225 starts to predict the next data (operation S310). Operation S310 may be the same as operation S200 described above with reference to FIG. 4, or may be a separate operation from the operation S200 described above with reference to FIG. 4 depending on implementation.

For example, referring to FIG. 7, a read command may be transmitted to a storage device 820 when the host 100 accesses the storage device 820 using a virtual address. The storage device 820 may be identical or similar to the storage device 200 illustrated in FIG. 3. The interface of the storage device 820, which is not shown in FIG. 7 but may be identical or similar to the interface 205 illustrated in FIG. 3, may transmit the command to the memory controller 800. The memory controller 800 may be identical or similar to the memory controller 215 illustrated in FIG. 3. Then, the address prediction module 830 of the memory controller 800 may start a prediction operation on the next data to be accessed by the host 100. The address prediction module 830 may be identical or similar to the address prediction module 225 illustrated in FIG. 3.

Referring back to FIG. 6, in operation S315, it is determined whether the request from the host 100 is a sequential request or a random request.

For example, referring to FIG. 3, the host 100 may access the storage device 200 by issuing sequential requests or random requests. Accordingly, the memory controller 215 may determine whether the access of the host 100 is contiguous or random.

The process performed when the host 100 accesses the storage device 200 according to a sequential request will be described first (Yes in operation S315).

Referring to FIG. 6, the memory controller 215 checks to determine whether the sequential request from the host 100 to the storage device 200 has been made more than k times, in which k is a natural number (operation S320). If the sequential request has been made more than k times (Yes in operation S320), the memory controller 215 may prefetch the $(k+1)^{th}$ data into an external storage device (operation S330).

For example, referring to FIG. 7, when the host 100 accesses the storage device 820 from the physical address of the first data to the physical address of the $k^{th}$ data contiguously (e.g., first, second, third, etc.), the address prediction module 830 may predict that the data to be accessed next by the host 100 is the $(k+1)^{th}$ data. Accordingly, the address prediction module 830 may prefetch data having the physical address of the $(k+1)^{th}$ data into another storage device 850 (for example, the main memory device) via a prefetcher 810. The prefetcher 810 may be identical or similar to the prefetcher 220 illustrated in FIG. 3. As a result of this prefetch operation, the response speed of the host 100 accessing the storage device 200 can be improved. In FIG. 7, the storage device 820 and the another storage device 850 constitute a storage system 840.

The process that is performed when a sequential request from the host 100 to the storage device 200 is not made more than k times (No in operation S320) will be described with reference to FIG. 6. For example, referring to FIG. 7, in exemplary embodiments, if the host 100 accesses only up to the $(k-1)^{th}$ data in the storage device 820, the prefetcher 810 of the storage device 820 does not prefetch the $(k+1)^{th}$ data into another storage device 850.

The process that is performed when a random request from the host 100 to the storage device 200 is made (No in operation S315) will be described with reference to FIG. 6.

If the host 100 accesses the storage device 200 using a random request (No in operation S315), the memory controller 215 builds a database for random requests (operation S340), and checks to determine whether there is a rule among the physical addresses of the data up to the $k^{th}$ request of the random requests based on the database (operation S345). If there is a rule among the physical addresses of the data up to the $k^{th}$ request (Yes in operation S345), the $(k+1)^{th}$ data may be prefetched into an extended storage device according to the rule (operation S350).

The process that is performed when a random request from the host 100 to the storage device 200 is not made more than k times (No in operation S345) will be described with reference to FIG. 6. For example, referring to FIG. 7, in exemplary embodiments, if the host 100 accesses only up to the $(k-1)^{th}$ data in the storage device 820, the prefetcher 810 of the storage device 820 does not prefetch the $(k+1)^{th}$ data into another storage device 850.

For example, referring to FIG. 7, when the host 100 issues a random request to the storage device 820, the address prediction module 830 may not be able to easily predict the next access request data subsequent to the current access request. However, in exemplary embodiments, the random requests may have a certain pattern. If the address prediction module 830 recognizes (e.g., learns) a certain pattern of the random requests, the address prediction module 830 can predict the next access request subsequent to the current access request.

The address prediction module 830 may have a learning capability for patterns of requests to be accessed from the host 100. That is, in exemplary embodiments, the address prediction module 830 may be configured to learn patterns of requests to be accessed from the host 100. The address prediction module 830 may build a database for physical addresses of data accessed from the host 100 to provide the learning capability. For example, the address prediction module 830 can detect a rule between the physical address of the currently accessed data and the physical address of the data to be accessed next.

For example, the address prediction module 830 can recognize the rule among the physical addresses of data accessed up to the $k^{th}$ data of the physical addresses of the data in the database (e.g., a rule that physical addresses are incremented by four, such as first, fifth, ninth, etc.). The address prediction module 830 can predict that the $(k+1)^{th}$ data to be accessed by the host 100 has the recognized rule with the physical address of the $k^{th}$ data. The address prediction module 830 may prefetch data having the physical address of the $(k+1)^{th}$ data into another storage device 850 (for example, the main memory device) via the prefetcher 810. As a result, the response speed of the host 100 accessing the storage device 820 can be improved.

In exemplary embodiments, the address prediction module 830 may regard the data accesses up to the $k^{th}$ data as a bulk read, and may prefetch the $(k+1)^{th}$ data into another storage space (operations S330 and 350 of FIG. 6). If contiguous accesses or random but regular accesses occur less than k times, the predicted data may not be prefetched. According to exemplary embodiments, the accuracy of the next predicted data can be increased only when the access of the host 100 is repeated more than a predetermined number of times, and the predicted data may be prefetched only for the accesses regarded as the bulk read.

Referring back to FIG. 4, the memory controller 215 prefetches the data predicted in operation S300 into another storage device such as, for example, the main memory device (operation S400). For example, referring to FIG. 3, once the address prediction module 225 of the memory controller 215 predicts the data to be accessed next by the host 100, the prefetcher 220 of the memory controller 215 may prefetch the predicted data into an external storage device such as, for example, the main memory device, which has a faster speed than the storage device 200.

Referring back to FIG. 4, the memory controller 215 modifies the physical address (operation S500).

For example, referring to FIG. 8, the memory controller 215 may modify a physical address using the page table 150 in the memory management unit 104.

In addition, referring to FIG. 9, the memory controller 215 may modify the physical address using the page table 150 in the memory management unit 104 or the translation lookaside buffer 108.

The memory management unit 104 and the translation lookaside buffer 108 are identical to those described above with reference to FIG. 1.

Referring to FIG. 10, the memory controller 215 may modify the physical addresses of a page table 155 from the physical addresses corresponding to the storage region 210 before prefetch, to the physical addresses corresponding to an external storage device after prefetch. The page table 155 illustrated in FIG. 10 may be identical or similar to the page table 150 illustrated in FIG. 2.

Figure 11:
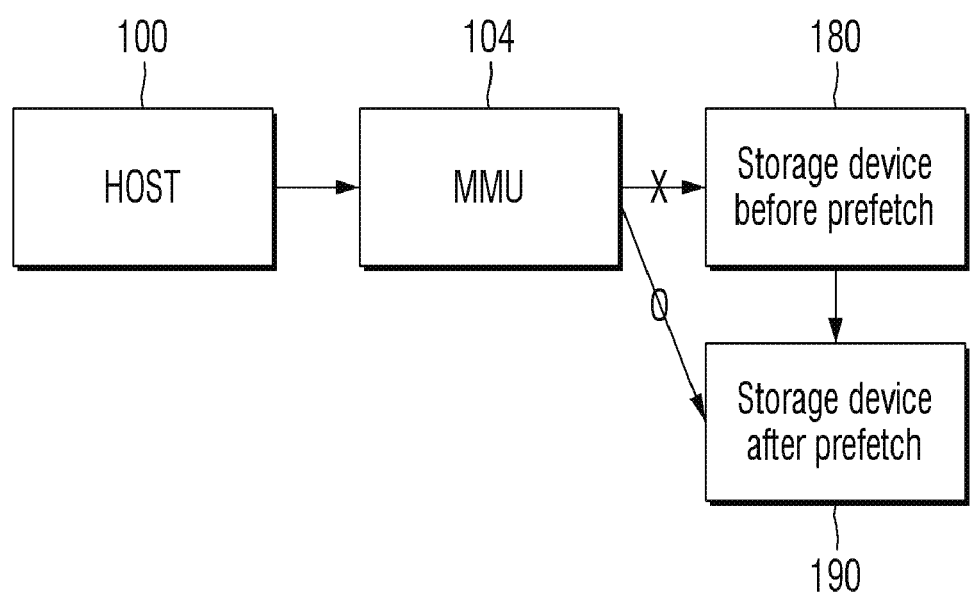
FIG. 11 is a block diagram illustrating a process of a host accessing predicted data according to the prefetch operation described above with reference to FIG. 4.

FIG. 11 is a block diagram illustrating a process of a host (e.g., the host 100 illustrated in FIG. 3) accessing predicted data according to the prefetch operation described above with reference to FIG. 4.

Referring to FIG. 11, as described above with reference to FIG. 1, the CPU 130 may send virtual addresses to the memory management unit 104 when accessing the memory 124 from the host 100. The page table 155 (see FIG. 10) of the memory management unit 104 may be modified by the memory controller 215 as described above with reference to FIG. 4. For example, the physical addresses can be modified without the intervention of the host 100 (e.g., without modifying the application or adding a separate layer). In this manner, the host 100 need not recognize that the predicted data has been prefetched into another storage device. Instead, the memory controller 215 may access the predicted data stored in another storage device (e.g., the main memory device having a relatively fast speed) using the physical address modified by the memory controller 215 by accessing the storage device where the predicted data is stored before the prefetch. Thus, according to exemplary embodiments, the access speed of the host 100 is improved by way of accessing the data after the prefetch without modifying the application or adding another layer.

For example, in a conventional storage system that includes a main memory device having a relatively small capacity and providing relatively fast access, and an auxiliary memory device having a relatively large capacity and providing relatively slow access, frequently accessed data in the auxiliary memory device may be read and prefetched into the main memory device. However, the prefetch techniques used to accomplish this include modifying a host or an application at the host level, or adding a separate layer for access to the prefetched data prefetched into the main memory device. Since these techniques require additional resources, modification to the host, and/or a separate layer for operation, the complexity and manufacturing cost of the conventional storage system are increased.

In contrast, exemplary embodiments of the present disclosure provide a storage device including secondary memory that predicts the next access operation from a host/application. Since the access speed of the secondary memory is slower than a primary memory buffer of the storage device, the secondary memory (e.g., the memory controller in the secondary memory) may prefetch the predicted next data to the primary memory buffer. In exemplary embodiments, to prefetch the predicted next data, the secondary memory may modify the physical address of the predicted next data. This allows the host/application to access the predicted next data at a high access speed without the need to modify the host/application. For example, only the secondary memory changes the physical address of the predicted next data, allowing the storage device to be used with a host/application without having to modify the host/application, and without having to add a separate layer for access to the prefetched next data, thus providing an improved storage device having improved speed, decreased complexity and decreased manufacturing costs.

For example, referring to FIG. 10, when access of the host 100 is completed, the memory controller 215 may update the physical addresses of the page table 155 back to its original values. For example, the memory controller 215 may modify the page table 155 from the physical addresses corresponding to the extended storage device after the prefetch into the physical addresses corresponding to the storage region 210 before the prefetch to thereby restore the physical addresses back to their original values. For example, after the host 100 is finished accessing the storage device 200, the memory controller 215 may change the physical addresses of the page table 155 that correspond to the extended storage device after the prefetch operation back to the physical addresses that correspond to the storage region 210 before the prefetch operation, thereby restoring the physical addresses back to their original values.

Figure 12:
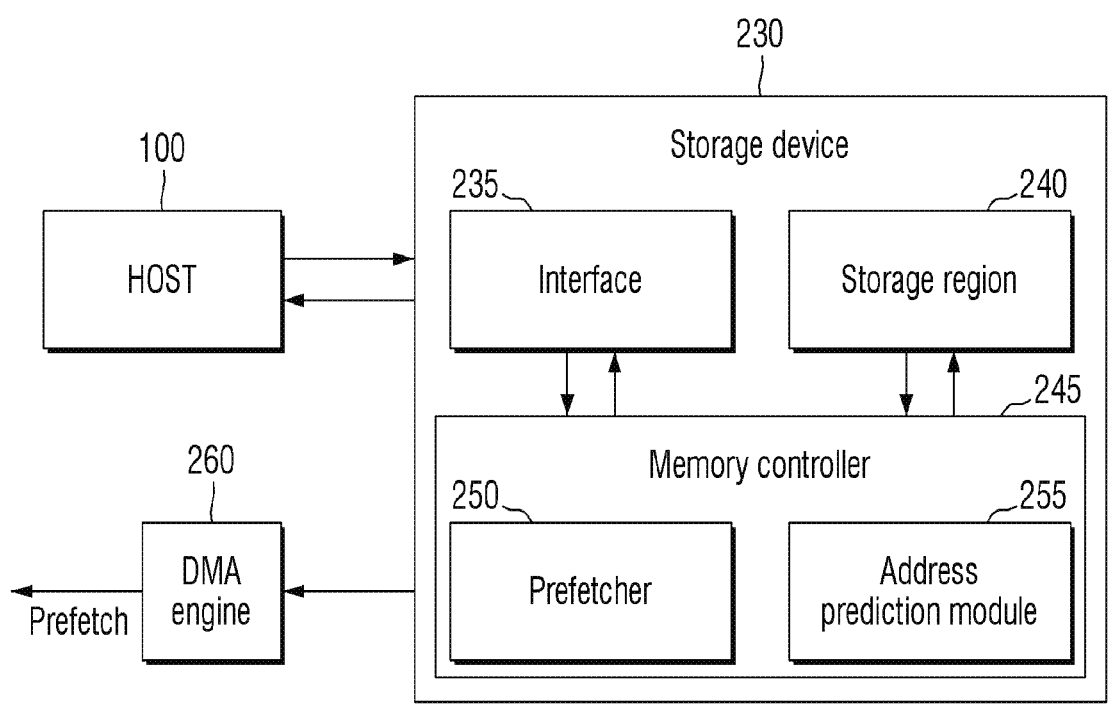
FIG. 12 is a block diagram of a storage device according to exemplary embodiments of the present disclosure.
Figure 13:
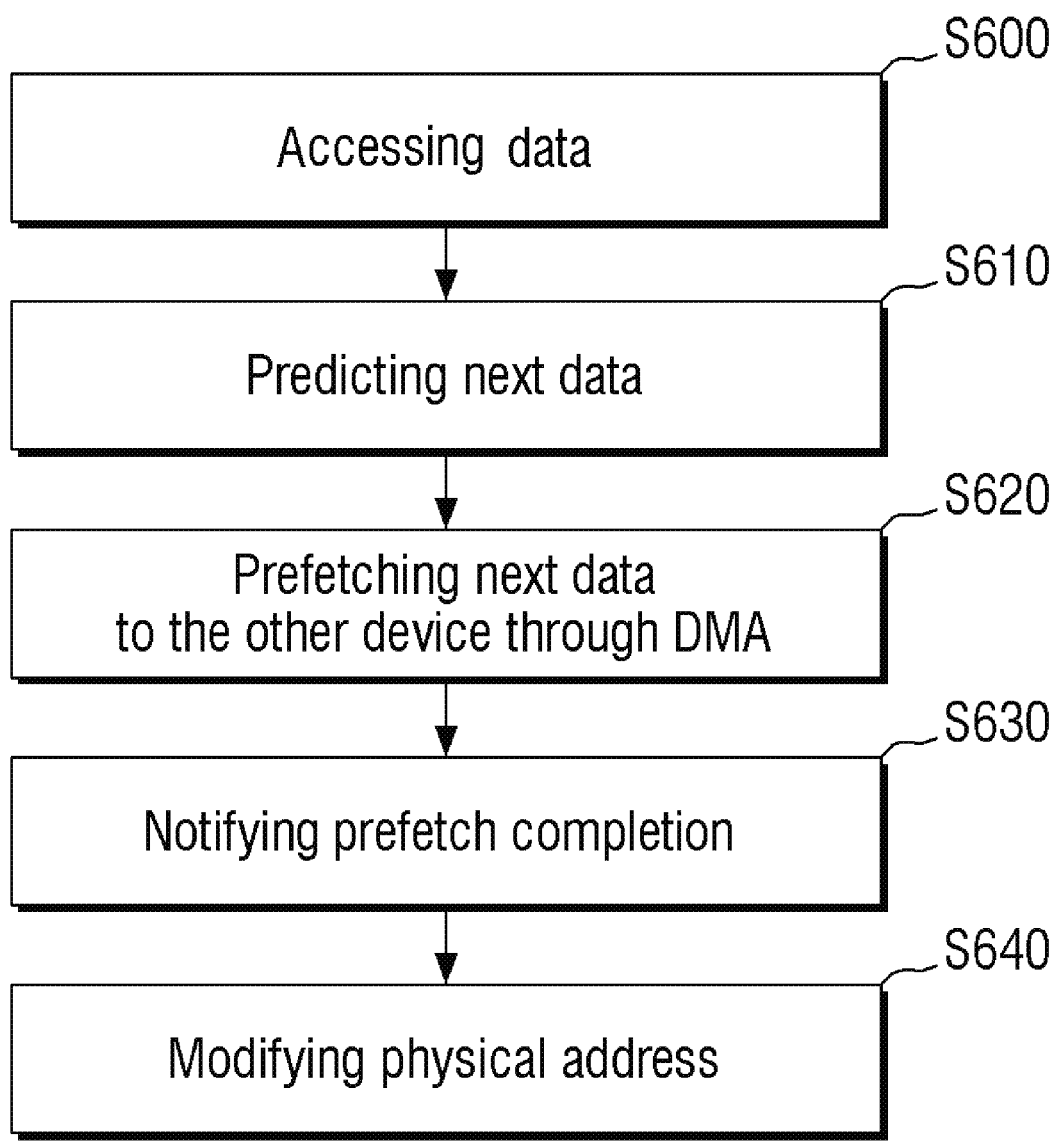
FIG. 13 is a flowchart illustrating the operation of the storage device of FIG. 12.

FIG. 12 is a block diagram of a storage device according to exemplary embodiments of the present disclosure. FIG. 13 is a flowchart illustrating the operation of the storage device of FIG. 12.

Hereinafter, for convenience of explanation, a further description of components and technical aspects previously described may be omitted, and the description may focus primarily on differences from the exemplary embodiments described above.

Referring to FIG. 12, a storage device 230 may perform a prefetch operation using a direct memory access (DMA) engine 260. The storage device 230 may be identical or similar to the storage device 200 illustrated in FIG. 3.

The storage device 230 may directly access an external device (e.g., another storage device, a hard disk, a graphics card, a network card, a sound card, etc.) via the DMA engine 260 to read/write data from/to the external device. The DMA engine 260 may be a function supported by the bus. A portion of the storage device 230 may be designated as an area to be used for the DMA engine 260. By using the DMA engine 260, in exemplary embodiments, the CPU 130 is not involved in data transfer. As a result, in exemplary embodiments, data can be transmitted with a larger bandwidth, and the performance of the storage device 230 can be improved. In the DMA engine 260, information such as, for example, an object to communicate data, a location (e.g., address) of data to be communicated, and the size of data to be communicated may be programmed or set. The DMA engine 260 may communicate with an external device depending on a program or setting. A memory controller 245 may transmit data to another storage region having a larger bandwidth via the DMA engine 260. As a result, the speed of the storage device 230 may be improved. The memory controller 245 may be identical or similar to the memory controller 215 illustrated in FIG. 3.

Referring to FIG. 13, in operation S610, the address prediction module 255 of the memory controller 245 predicts the data to be accessed next by the host 100 based on the data accessed by the host 100 using the virtual address in operation S600. Operations S600 and S610 are identical to operations S200 and S300 of FIG. 4, respectively. Thus, for convenience of explanation, a further description thereof will be omitted. The address prediction module 255 illustrated in FIG. 12 may be identical or similar to the address prediction module 225 illustrated in FIG. 3.

The memory controller 245 of the storage device 230 prefetches the data predicted by the address prediction module 255 into an external storage device through a prefetcher 250. The prefetcher 250 prefetches the data into the external storage device via the DMA engine (operation S620).

For example, referring to FIG. 12, the prefetcher 250 may prefetch the data predicted by the address prediction module 255 of the memory controller 245 into an external device via the DMA engine 260. In FIG. 12, the interface 235 and the storage region 240 may be identical or similar to the interface 205 and the storage region 210 illustrated in FIG. 3, respectively.

Referring back to FIG. 13, after the DMA engine 260 completes the prefetch operation, the storage device 230 is notified of the completion of the prefetch operation (operation S630).

For example, referring to FIG. 12, the storage device 230 may perform other tasks while the DMA engine 260 performs communications for the data prefetched from the prefetcher 250. Once the communications are completed, the DMA engine 260 may notify the storage device 230 of completion by sending an interrupt indicating that the communications have been completed.

Referring back to FIG. 13, after the prefetch operation has been completed, the memory controller 245 modifies the page table 155 with the physical addresses of the prefetched, external storage device (operation S640).

For example, referring to FIG. 12, after the prefetch operation has been completed, the memory controller 245 modifies the page table 155 with the physical address of the prefetched, external storage device, so that the host 100 may access the prefetched external storage device when it accesses the predicted data later.

Figure 14:
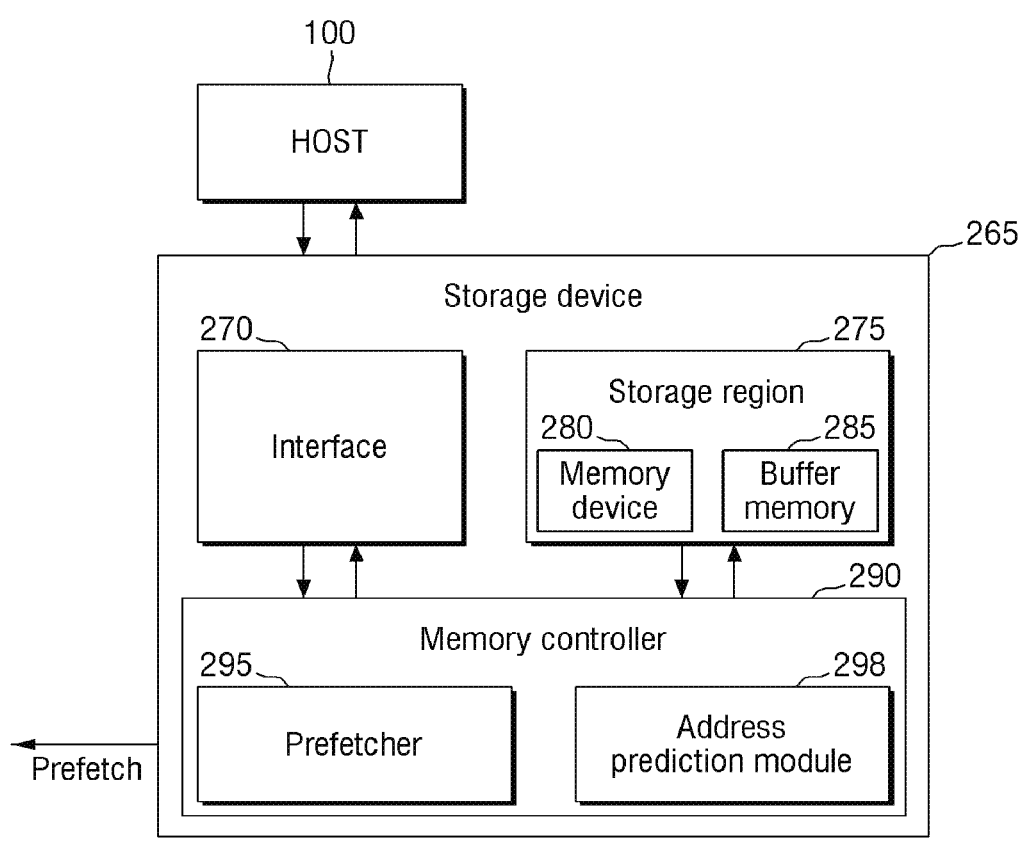
FIG. 14 is a block diagram of a storage device according to exemplary embodiments of the present disclosure.
Figure 15:
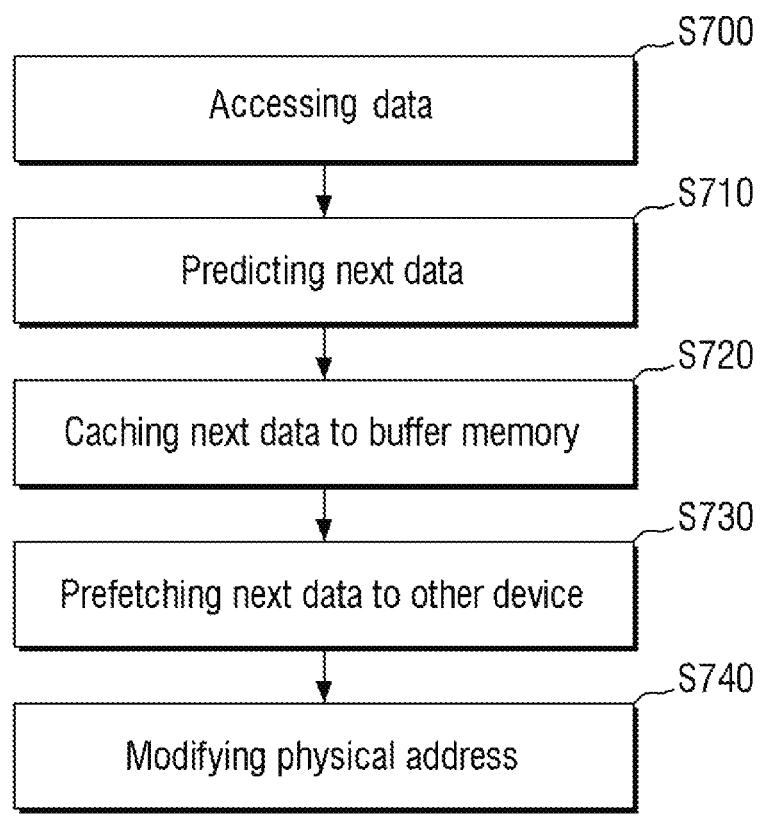
FIG. 15 is a flowchart illustrating the operation of the storage device of FIG. 14.

FIG. 14 is a block diagram of a storage device according to exemplary embodiments of the present disclosure. FIG. 15 is a flowchart illustrating the operation of the storage device of FIG. 14.

Hereinafter, for convenience of explanation, a further description of components and technical aspects previously described may be omitted, and the description may focus primarily on differences from the exemplary embodiments described above.

Referring to FIG. 14, a storage region 275 of a storage device 265 may include a memory device 280 having a relatively large capacity and a buffer memory 285 having a relatively small capacity and a relatively fast access time. The memory device 280 may also be referred to herein as a memory element, which is capable of storing data. For example, the memory device 280 may have a relatively larger capacity compared to the capacity of the buffer memory 285, and the access time of the buffer memory 285 may be relatively faster compared to the access time of the memory device 280. The storage device 265 and the storage region 275 may be identical or similar to the storage device 200 and the storage region 210 illustrated in FIG. 3, respectively.

The memory device 280 may include, for example, a PRAM, an RRAM, an MRAM, an STT-MRAM, a FeRAM, a NOR flash memory or a NAND flash memory. Different types of memory devices may be combined. The memory device 280 may also include block storage. The interface 270 may be a byte-accessible interface that provides byte-accessibility, such as, for example, a PCIe interface. The interface 270 may be identical or similar to the interface 205 illustrated in FIG. 3.

The data transfer rate of the host 100 by the bus format may be relatively faster than the data transfer rate of the memory device 280 of the storage region 275. For example, when the interface speed of the host 100 is much faster, the performance degradation caused by the speed difference can be reduced by employing the buffer memory 285. The buffer memory 285 may be implemented as, for example, a synchronous DRAM to provide sufficient buffering in the storage device 265 used as an auxiliary memory device having a large capacity. However, it is to be understood that exemplary embodiments of the present disclosure are not limited thereto.

The buffer memory 285 may store at least a portion of the data stored in the memory device 280. Write data provided from the host 100 may be temporarily stored in the buffer memory 285. In addition, the data prefetched from the memory device 280 in response to a read request from the host 100 may also be temporarily stored in the buffer memory 285. When data existing in the memory device 280 is cached in the buffer memory 285 at the time of the read request from the host 100, the buffer memory 285 may support a cache function for providing the cached data directly to the host 100. Since the cached data may be directly provided to the host 100, in exemplary embodiments, the host 100 does not access the memory device 280 at this time. For example, the cached data may be provided to the host 100 directly from the buffer memory 285 without the host 100 accessing the memory device 280. As a result, the speed of the storage device 265 is improved according to exemplary embodiments.

Referring to FIG. 15, in operation S710, an address prediction module 298 of a memory controller 290 of the storage device 265 predicts the data to be accessed next by the host 100 based on the data accessed by the host 100 using the virtual address in operation S700. Operations S700 and S710 are identical to operations S200 and S300 of FIG. 4, respectively. Thus, for convenience of explanation, a further description thereof will be omitted. The address prediction module 298 and the memory controller 290 illustrated in FIG. 14 may be identical or similar to the address prediction module 225 and the memory controller 215 illustrated in FIG. 3, respectively.

The data predicted by the address prediction module 298 of the memory controller 290 is cached in the buffer memory 285 in the storage region 275 (operation S720).

For example, referring to FIG. 14, the memory controller 290 may cache the data predicted by the address prediction module 298 in the buffer memory 285.

Referring back to FIG. 15, the predicted data cached in the buffer memory 285 is prefetched into an external storage device (operation S730).

For example, referring to FIG. 14, a prefetcher 295 may prefetch the data cached in the buffer memory 285 into another storage device. The prefetcher 295 may be identical or similar to the prefetcher 220 illustrated in FIG. 3.

Referring back to FIG. 15, the memory controller 290 modifies the buffer memory 285 physical addresses of the page table 155 into the physical addresses of the external storage device after the prefetch operation is completed (operation S740).

For example, referring to FIG. 14, after the prefetch operation has been completed, the memory controller 290 modifies the page table 155 with the physical addresses of the prefetched, external storage space, so that the host 100 may access the prefetched external storage device when it accesses the predicted data later.

Figure 16:
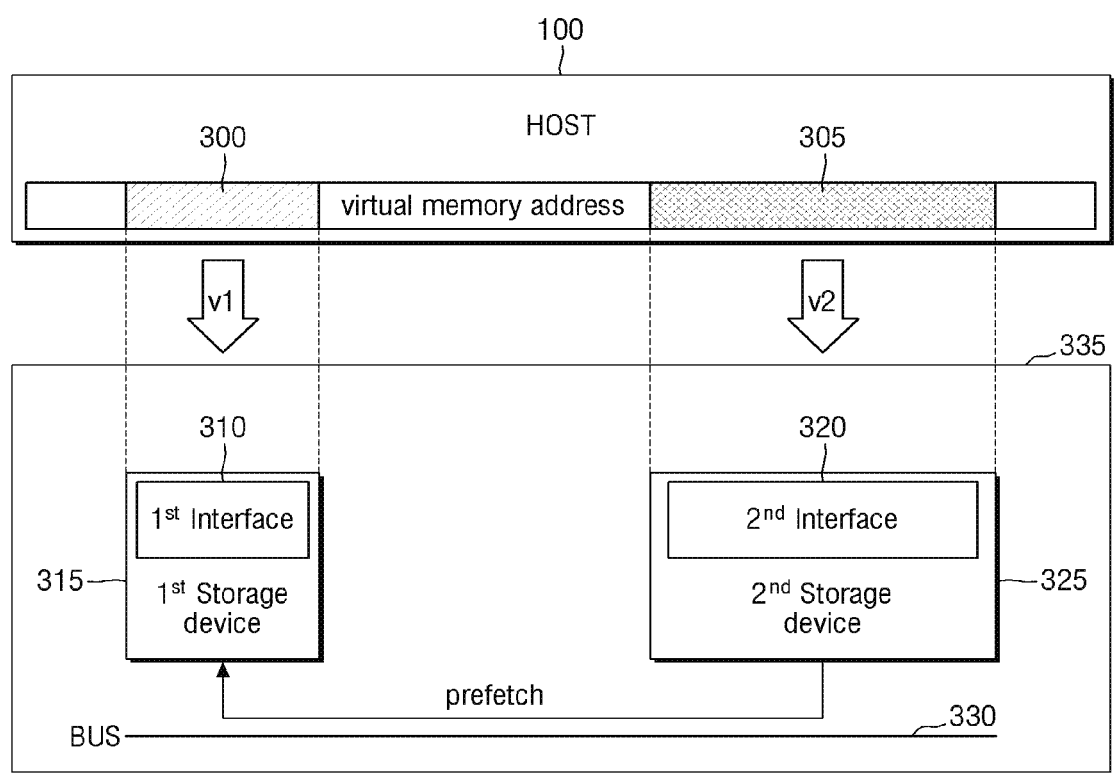
FIG. 16 is a block diagram of a storage system according to exemplary embodiments of the present disclosure.

FIG. 16 is a block diagram of a storage system according to exemplary embodiments of the present disclosure.

Referring to FIG. 16, the host 100 may be connected to a storage system 335 to implement a single data processing system. Such a data processing system may be implemented as, but is not limited to, a personal computer (PC), a workstation, a data center, an Internet data center (IDC), a direct attached storage (DAS) system, a storage area network (SAN) system, a network attached storage (NAS) system, a redundant array of inexpensive disks or redundant array of independent disks (RAID) systems, or a mobile device.

The mobile device may be implemented as, but is not limited to, a laptop computer, a mobile phone, a smartphone, a tablet PC, a personal digital assistant (PDA), an enterprise digital assistant (EDA), a digital still camera, a digital video camera, a portable multimedia player (PMP), a personal navigation device or a portable navigation device (PND), a handheld game console, a mobile Internet device (MID), a wearable computer, an Internet of things (IoT) device, an Internet of everything (IoE) device, a drone, or an e-book.

The storage system 335 may include a first storage device 315, a second storage device 325 that performs the prefetch operation described above with reference to FIG. 3, and a bus 330. The second storage device 325 may be identical or similar to the storage device 200 illustrated in FIG. 3.

The first storage device 315 and the second storage device 325 may include a first interface 310 and a second interface 320, respectively. According to exemplary embodiments of the present disclosure, the first and second interfaces 310 and 320 may work as a data transfer path between the host 100 and the first and second storage devices 315 and 325, respectively.

The first and second interfaces 310 and 320 may be implemented as, but are not limited to, interfaces providing byte accessibility such as, for example, a PCI interface, a PCIe interface, an NVMe interface and a DIMM interface. The first and second interfaces 310 and 320 may transmit electrical signals or optical signals.

In exemplary embodiments, the first and second interfaces 310 and 320 may be the same type of interface, or may be different types of interfaces. In exemplary embodiments, the host 100 may be connected to the first storage device 315 and the second storage device 325 via different interfaces or via the same interface. In exemplary embodiments, the same interface used to connect the host 100 to the first storage device 315 and the second storage device 325 may be a dual in-line memory module (DIMM), the first storage device may be a dynamic random-access memory (DRAM), and the second storage device may be a non-volatile RAM (NVRAM).

The host 100 can access the first storage device 315 or the second storage device 325 using the virtual memory address as shown in the drawings.

In exemplary embodiments, the host 100 may access the data stored in the first storage device 315 at a first speed v1 and the data stored in the second storage device 325 at a second speed v2. The first speed v1 may be different from the second speed v2. For example, the first speed v1 may be faster than the second speed v2. The host 100, the first storage device 315 and the second storage device 325 having such characteristics can be implemented in a variety of ways.

Initially, the first interface 310 for connecting the host 100 with the first storage device 315 may be different from the second interface 320 for connecting the host 100 with the second storage device 325, such that the first speed v1 may be different from the second speed v2.

In addition, the first interface 310 for connecting the host 100 with the first storage device 315 may be the same as the second interface 320 for connecting the host 100 with the second storage device 325. The type of the first storage device 315 may be different from that of the second storage device, 325, such that the first speed v1 may be different from the second speed v2.

An example of the configuration will be described in detail below.

Figure 17:
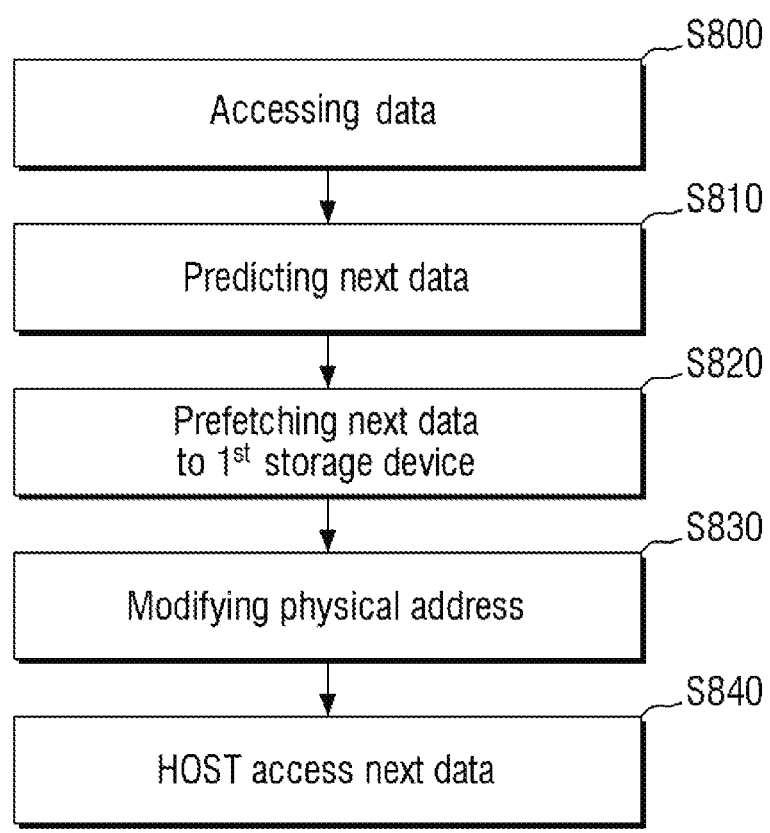
FIG. 17 is a flowchart illustrating the operation of the storage system of FIG. 16.
Figure 18:
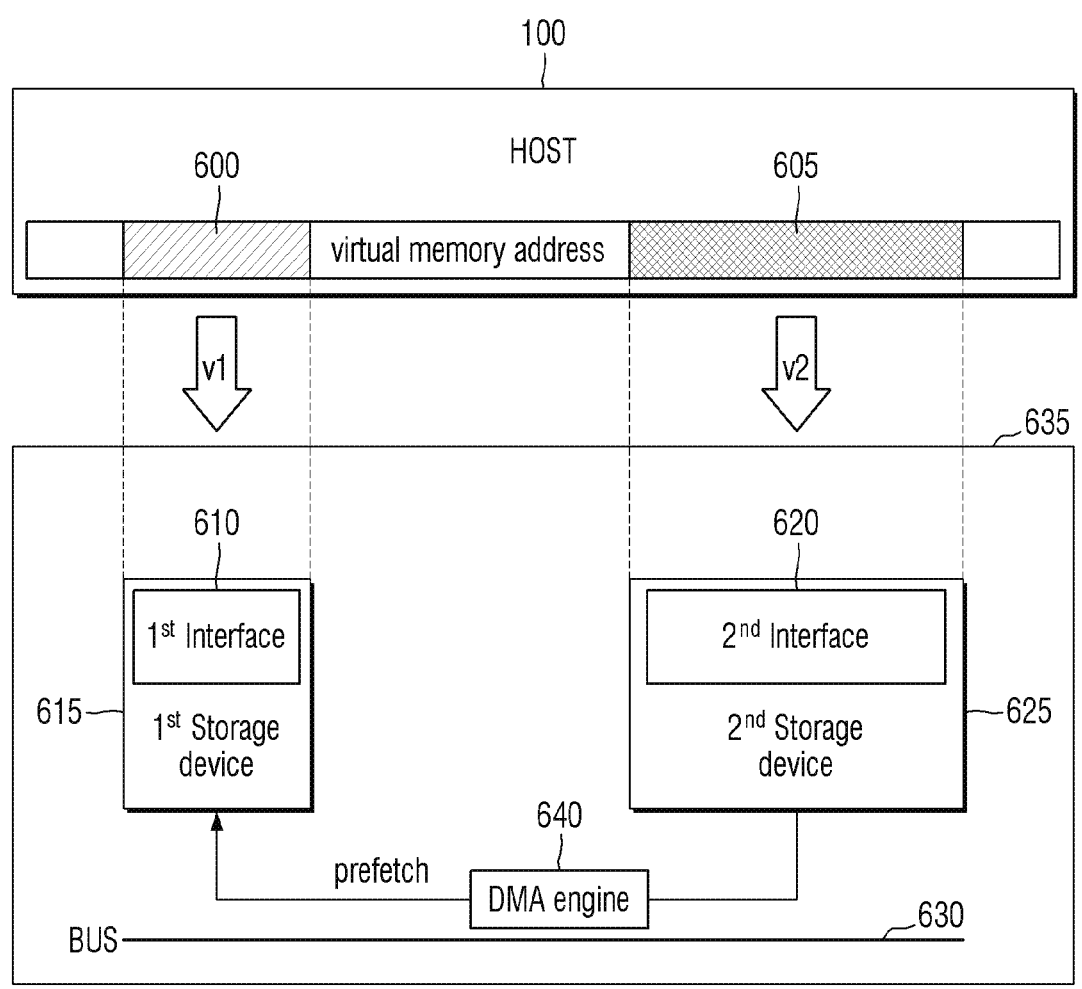
FIG. 18 is a block diagram illustrating a prefetch operation of the storage system of FIG. 16.
Figure 19:
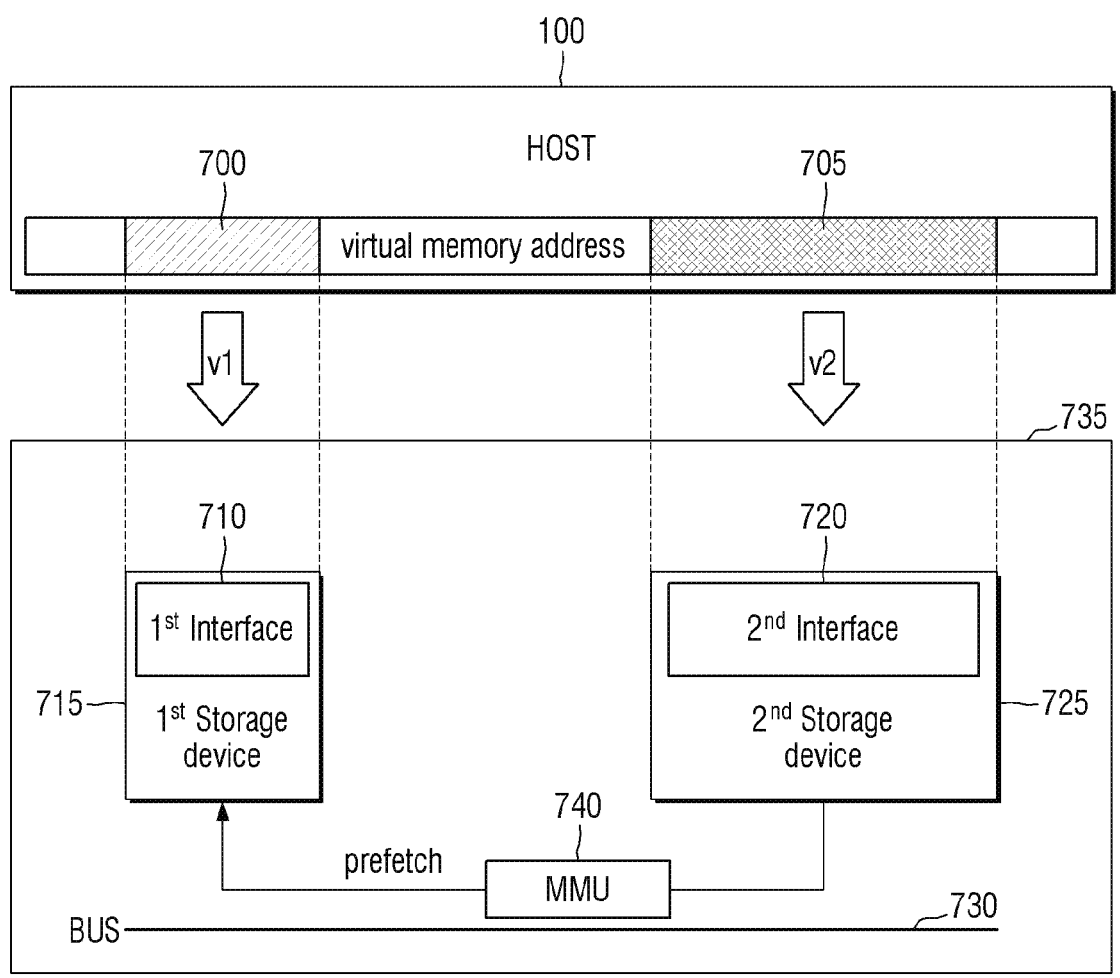
FIG. 19 is a block diagram illustrating a physical address modification operation of the storage system of FIG. 16.

FIG. 17 is a flowchart illustrating the operation of the storage system of FIG. 16. FIG. 18 is a block diagram illustrating a prefetch operation of the storage system of FIG. 16. FIG. 19 is a block diagram illustrating a physical address modification operation of the storage system of FIG. 16.

Referring to FIG. 17, the host 100 accesses data using a virtual address (operation S800). For example, referring to FIG. 16, the host 100 may access the second storage device 325 using a second virtual address 305. The host 100 may access the first storage device 315 using a first virtual address 300.

Still referring to FIG. 16, in exemplary embodiments, the first virtual address 300 refers to an address range including a third virtual address and a fourth virtual address contiguous with the third virtual address, and the second virtual address 305 is contiguous with the fourth virtual address and is different from the third virtual address.

Still referring to FIG. 16, in exemplary embodiments, the first storage device 315 may store first data, and the first data may be accessed by the host 100 using the first virtual address 300. The second storage device 325 may store second data, and the second data may be accessed by the host 100 using the second virtual address 305 and a third virtual address that is adjacent (e.g., directly adjacent) to the second virtual address 305. Thus, the address range denoted by 305 in FIG. 16 may refer to second and third virtual addresses. The second and third virtual addresses are different from the first virtual address 300. The second storage device 325 may predict predicted data to be accessed by the host 100 using a fourth virtual address that is adjacent (e.g., directly adjacent) to the third virtual address based on the second and third virtual addresses, and may prefetch the predicted data into the first storage device 315. The second, third and fourth virtual addresses may be contiguous virtual addresses. Thus, the address range denoted by 305 in FIG. 16 may refer to the second, third and fourth virtual addresses. In exemplary embodiments, the second, third and fourth virtual addresses may be contiguous virtual addresses. In exemplary embodiments, the second, third and fourth virtual addresses may be virtual addresses that are spaced apart from one another by a constant interval.

Referring again to FIG. 17, the address prediction module predicts the next data (operation S810). For example, referring to FIG. 16, the second interface 320 may transmit the information accessed by the host 100 to the second storage device 325. Then, the second storage device 325 may analyze the access pattern of the host 100 to predict data to be accessed next.

Referring back to FIG. 17, a memory controller of the second storage device 325, which is not illustrated in FIG. 16 but may be identical or similar to the memory controller 215 illustrated in FIG. 3, prefetches the next data into the first storage device 315 (operation S820). For example, referring to FIG. 16, the second storage device 325 may prefetch the predicted data into the first storage device 315 via the bus 330. Referring to FIG. 18, in which an exemplary embodiment of the present disclosure is shown, a second storage device 625 may perform a prefetch operation in which data is prefetched into a first storage device 615 via a DMA engine 640. The DMA engine 640 may be identical or similar to the DMA engine 260 illustrated in FIG. 12.

In FIG. 18, the first storage device 615 may be identical or similar to the first storage device 315 illustrated in FIG. 16. Further, the second storage device 625 may be identical or similar to the second storage device 325 illustrated in FIG. 16. Further, a first interface 610 may be identical or similar to the first interface 310 illustrated in FIG. 16. Further, a second interface 620 may be identical or similar to the second interface 320 illustrated in FIG. 16. Further, a bus 630 may be identical or similar to the bus 330 illustrated in FIG. 16. The first storage device 615, the second storage device 625, the DMA engine 640 and the bus 630 may constitute a storage system 635. The storage system 635 may be identical or similar to the storage system 335 illustrated in FIG. 16. A first virtual address 600 and a second virtual address 605 may be identical or similar to the first virtual address 300 and the second virtual address 306 illustrated in FIG. 16, respectively.

Referring back to FIG. 17, the memory controller of the second storage device 325 modifies the physical addresses (operation S830). For example, referring to FIG. 19, after a second storage device 725 prefetches the data predicted by a first storage device 715 via a bus 730, a memory controller of the second storage device 725, which is not illustrated in FIG. 19 but may be identical or similar to the memory controller 215 of FIG. 3, may modify the physical addresses in the page table 155 by a memory management unit (MMU) 740, as described above with reference to FIG. 10.

In FIG. 19, the first storage device 715 may be identical or similar to the first storage device 315 illustrated in FIG. 16. Further, the second storage device 725 may be identical or similar to the second storage device 325 illustrated in FIG. 16. Further, a first interface 710 may be identical or similar to the first interface 310 illustrated in FIG. 16. Further, a second interface 720 may be identical or similar to the second interface 320 illustrated in FIG. 16. Further, the bus 730 may be identical or similar to the bus 330 illustrated in FIG. 16. The first storage device 715, the second storage device 725, the MMU 740 and the bus 730 may constitute a storage system 735. The storage system 735 may be identical or similar to the storage system 335 illustrated in FIG. 16. A first virtual address 700 and a second virtual address 705 may be identical or similar to the first virtual address 300 and the second virtual address 306 illustrated in FIG. 16, respectively.

Referring back to FIG. 17, the host 100 accesses data using the modified physical virtual address (operation S840). The operation has been described above in detail with reference to FIG. 11. Thus, for convenience of explanation, a further description thereof will be omitted.

Figure 20:
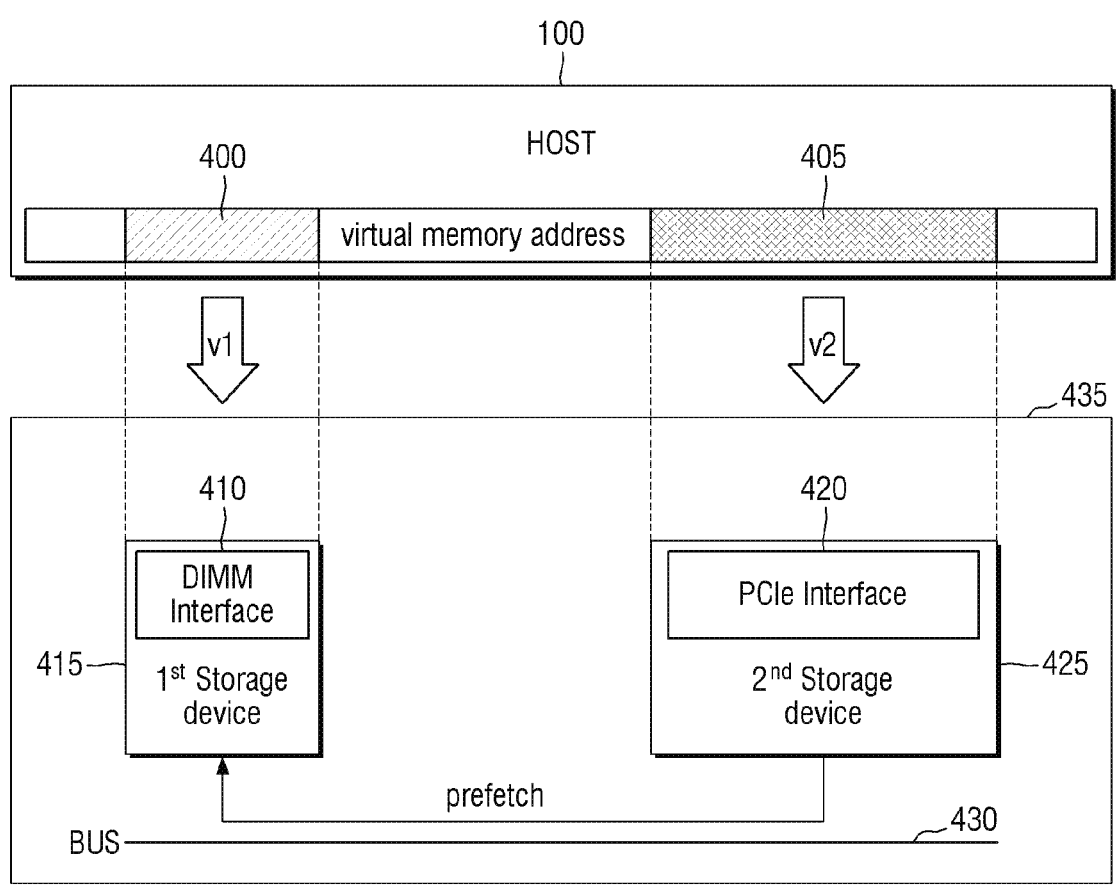
FIG. 20 is a block diagram of a storage system according to exemplary embodiments of the present disclosure.

FIG. 20 is a block diagram of a storage system according to exemplary embodiments of the present disclosure.

Referring to FIG. 20, an interface of a first storage device 415 may be a DIMM interface 410, and an interface of a second storage device 425 may be a PCIe interface 420. However, the present disclosure is not limited thereto. The DIMM interface 410 may provide data access in the unit of bytes.

The PCIe interface 420 may implement point-to-point serial interconnection for communications between the host 100 and the second storage device 425. A plurality of PCIe interfaces 420 may be interconnected using switches. As a result, a large number of devices can be connected together in the system (a storage system 435). In exemplary embodiments, the transmit and receive data rates of the PCIe interface 420 may be, but is not limited to, about 2.5 Gbits/sec.

The PCIe interface 420 uses only several pins per device package for the serial interconnection. As a result, the design cost for the PCIe interface 420 chip may be reduced, and the board design complexity may be reduced. The performance of the PCIe interface 420 may also be expandable.

In FIG. 20, the first storage device 415 may be identical or similar to the first storage device 315 illustrated in FIG. 16. Further, the second storage device 425 may be identical or similar to the second storage device 325 illustrated in FIG. 16. Further, the first interface 410 may be identical or similar to the first interface 310 illustrated in FIG. 16. Further, the second interface 420 may be identical or similar to the second interface 320 illustrated in FIG. 16. Further, the bus 430 may be identical or similar to the bus 330 illustrated in FIG. 16. The first storage device 415, the second storage device 425 and the bus 430 may constitute the storage system 435. The storage system 435 may be identical or similar to the storage system 335 illustrated in FIG. 16. A first virtual address 400 and a second virtual address 405 may be identical or similar to the first virtual address 300 and the second virtual address 306 illustrated in FIG. 16, respectively.

Figure 21:
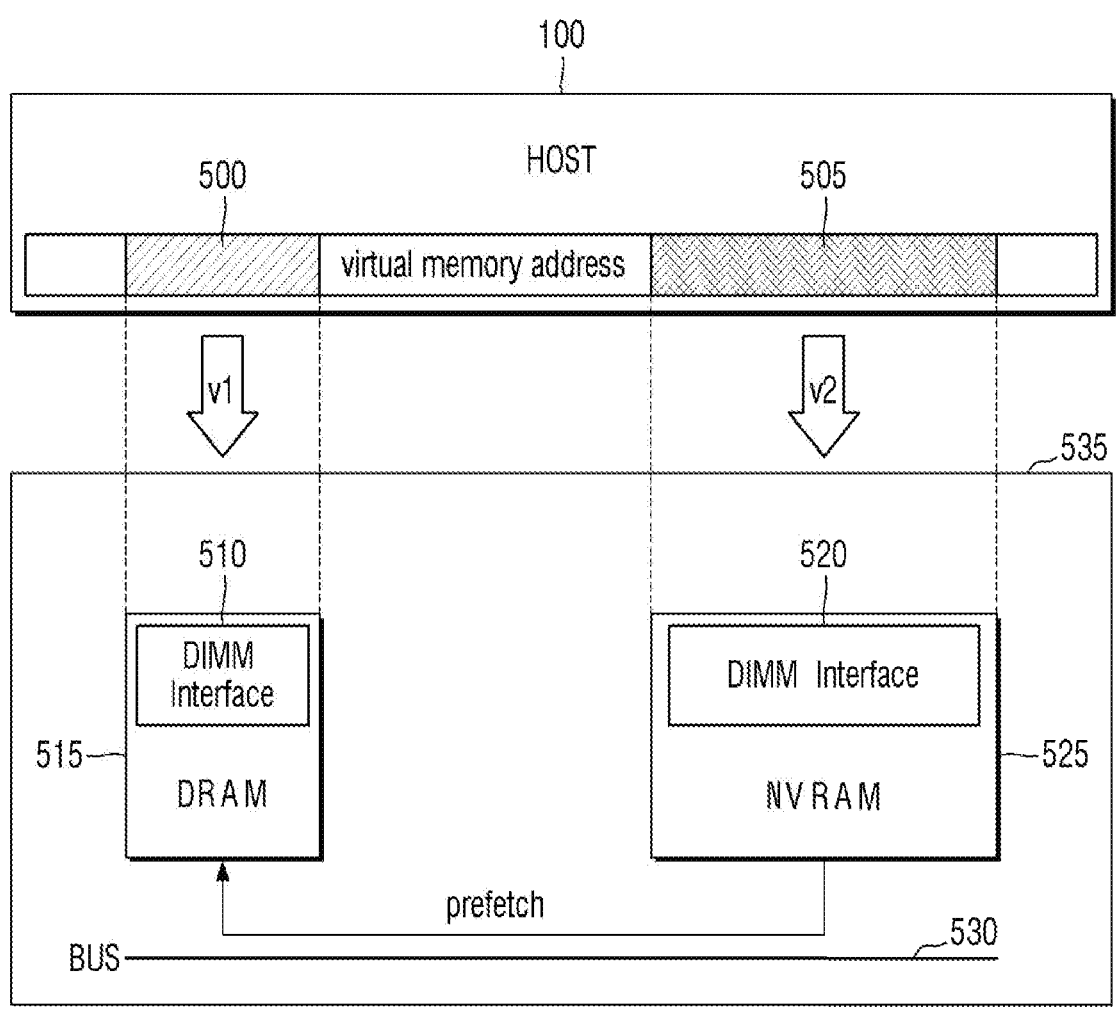
FIG. 21 is a block diagram of a storage system according to exemplary embodiments of the present disclosure.

FIG. 21 is a block diagram of a storage system according to exemplary embodiments of the present disclosure.

Referring to FIG. 21, a first storage device 515 of a storage system 535 may include a DRAM, and a second storage device 525 of the storage system 535 may include an NVRAM.

First and second interfaces 510 and 520 may include the same DIMM interface.

However, the present disclosure is not limited thereto.

The NVRAM may include, for example, a PRAM, an RRAM, an MRAM, an STT-MRAM, and a FeRAM. Different types of memory devices may be combined, however the present disclosure is not limited thereto.

In FIG. 21, the first storage device 515 may be identical or similar to the first storage device 315 illustrated in FIG. 16. Further, the second storage device 525 may be identical or similar to the second storage device 325 illustrated in FIG. 16. Further, the first interface 510 may be identical or similar to the first interface 310 illustrated in FIG. 16. Further, the second interface 520 may be identical or similar to the second interface 320 illustrated in FIG. 16. Further, a bus 530 may be identical or similar to the bus 330 illustrated in FIG. 16. The first storage device 515, the second storage device 525 and the bus 530 may constitute the storage system 535. The storage system 535 may be identical or similar to the storage system 335 illustrated in FIG. 16. A first virtual address 500 and a second virtual address 505 may be identical or similar to the first virtual address 300 and the second virtual address 306 illustrated in FIG. 16, respectively.

As is traditional in the field of the present disclosure, exemplary embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A storage device, comprising:
    a storage region in which first data is stored, wherein the storage region is accessed using a first virtual address; and
    a memory controller disposed external to a host and configured to control stored data stored in the storage region,
    wherein the memory controller predicts second data to be accessed using a second virtual address based on the first virtual address, prefetches the second data into an external device which is disposed external to the host, and modifies a physical address mapped to the second virtual address,
    wherein the prefetched second data is accessible by the host in communication with the storage device.

2. The storage device of claim 1, wherein the memory controller prefetches the second data into the external device via a direct memory access (DMA) engine.

3. The storage device of claim 1, wherein the memory controller controls a memory management unit (MMU) of a host, and the prefetched second data is accessible via the MMU.

4. The storage device of claim 3, wherein the memory controller modifies a physical address registered in a page table stored in a translation lookaside buffer (TLB) of the host.

5. The storage device of claim 1, wherein the storage region comprises:
    a memory element that stores the stored data; and
    a buffer memory that stores at least a part of the stored data stored in the memory element,
    wherein the second data is stored in the buffer memory before the second data is prefetched into the external device.

6. The storage device of claim 1,
    wherein the first virtual address comprises a third virtual address and a fourth virtual address contiguous with the third virtual address,
    wherein the second virtual address is contiguous with the fourth virtual address and different from the third virtual address.

7. A storage system, comprising:
    a first storage device disposed external to a host and configured to store first data, wherein the first data is accessed by the host using a first virtual address at a first speed; and
    a second storage device disposed external to the host and configured to store second data, wherein the second data is accessed by the host using a second virtual address at a second speed,
    wherein the second virtual address is different from the first virtual address, and the second speed is different from the first speed,
    wherein the second storage device predicts predicted data to be accessed by the host based on the second virtual address, and prefetches the predicted data into the first storage device which is disposed external to the host.

8. The storage system of claim 7, further comprising:
    a memory management unit configured to translate at least one virtual address into at least one physical address,
    wherein the memory management unit stores a first physical address of the first storage device mapped to the first virtual address, and a second physical address of the second storage device mapped to the second virtual address.

9. The storage system of claim 7, wherein the first speed is faster than the second speed.

10. The storage system of claim 7, wherein the host is connected to the first storage device via a first interface, and the host is connected to the second storage device via a second interface different from the first interface.

11. The storage system of claim 10, wherein the first interface comprises a dual in-line memory module (DIMM) interface that provides data access in the unit of bytes, and the second interface comprises a peripheral component interconnect express (PCIe) interface.

12. The storage system of claim 7, wherein the host is connected to the first and second storage devices using a same interface.

13. The storage system of claim 12, wherein the interface comprises a dual in-line memory module (DIMM), the first storage device comprises a dynamic random-access memory (DRAM), and the second storage device comprises a non-volatile RAM (NVRAM).

14. The storage system of claim 7, further comprising:
a memory management unit configured to translate the first virtual address into a first physical address of the first storage device, and translate the second virtual address into a second physical address of the second storage device,
wherein the second storage device modifies the memory management unit, and the prefetched predicted data is accessible to the host.

15. The storage system of claim 7, wherein the second storage device comprises:
a first storage element having a first response speed for a read command; and
a second storage element having a second response speed faster than the first response speed,
wherein the second storage device prefetches data stored in the second storage element into the first storage device.

16. The storage system of claim 15, wherein the second storage device prefetches the predicted data into the first storage device via a direct memory access (DMA) engine.

17. A storage system, comprising:
a first storage device configured to store first data, wherein the first data is accessed by a host using a first virtual address and the first storage device is disposed external to the host; and
a second storage device disposed external to the host and configured to store second data, wherein the second data is accessed by the host using a second virtual address and a third virtual address,
wherein the second virtual address and the third virtual address are different from the first virtual address, and the second virtual address and the third virtual address are adjacent to each other,
wherein the second storage device predicts data to be accessed by the host using a fourth virtual address adjacent to the third virtual address based on the second and third virtual addresses, and prefetches the predicted data into the first storage device which is disposed external to the host.

18. The storage system of claim 17, wherein the second, third and fourth virtual addresses are contiguous virtual addresses.

19. The storage system of claim 17, wherein the second, third and fourth virtual addresses are spaced apart from one another by a constant interval.

20. The storage system of claim 17, wherein a first speed at which the host accesses the first data stored in the first storage device is faster than a second speed at which the host accesses the second data stored in the second storage device.

* * * * *